MEMORY SYSTEM

Filed Dec. 1, 1954

INVENTOR.
Charles S. Warren
BY Morris L. Rabkin
ATTORNEY.

United States Patent Office 2,882,517
Patented Apr. 14, 1959

2,882,517

MEMORY SYSTEM

Charles S. Warren, Collingswood, N.J., assignor to Radio Corporation of America, a corporation of Delaware Application December 1, 1954, Serial No. 472,284

10 Claims. (Cl. 340—174)

Figures 1, 2:
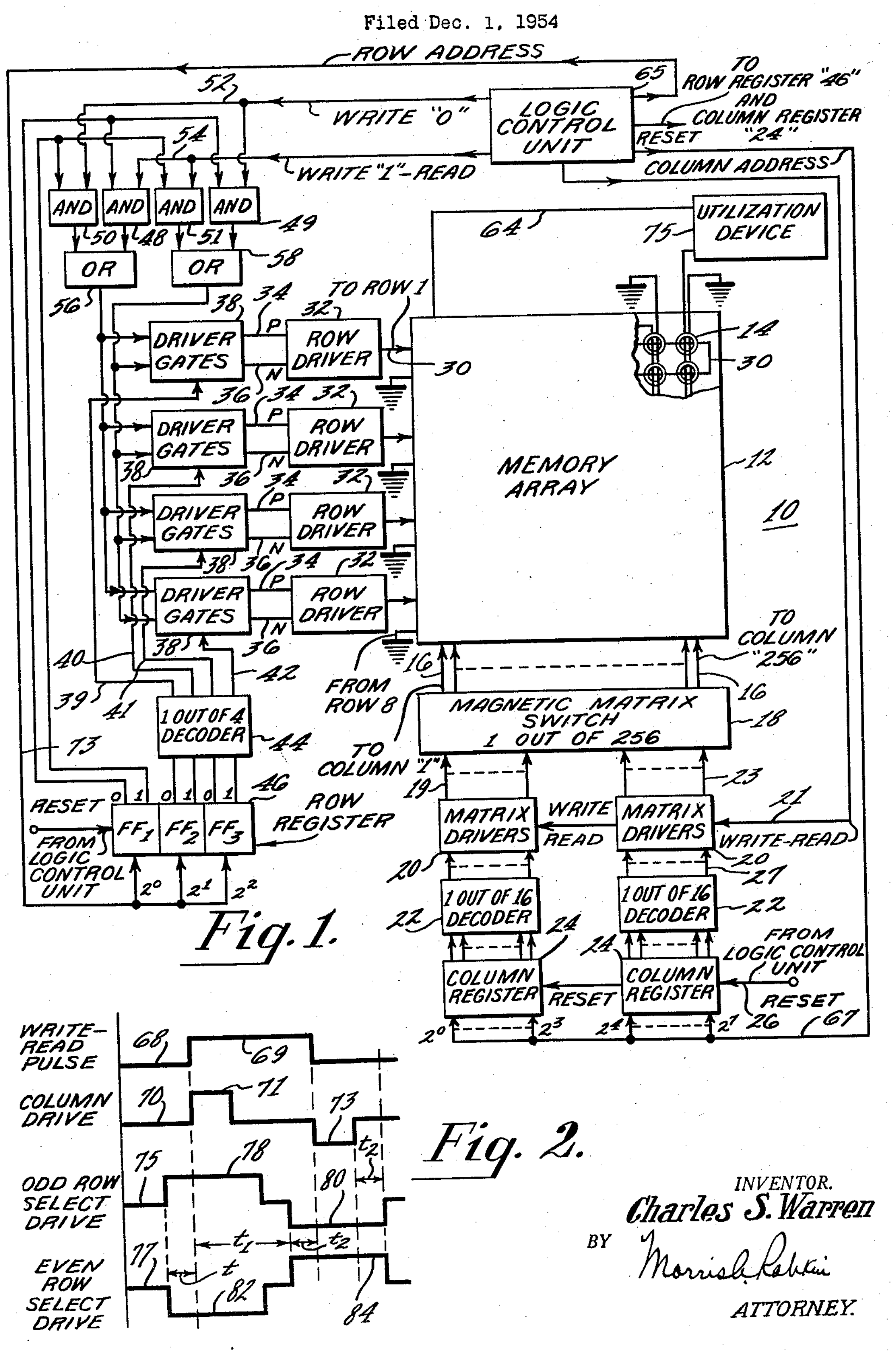

This invention relates to information storing systems, and particularly to an improved system for controlling the writing of information into and the reading of information out of memory matrices.

Matrices of binary cells are employed in the information handling art for storing binary coded information. A binary cell has two stable states. One stable state corresponds to a binary one and the other stable state corresponds to a binary zero. In an array of binary cells, information can be written into any given cell by applying an excitation to the array coordinates which intersect at the given cell position to drive the cell from one stable state to the other. In certain arrangements, the amplitude of the driving excitation applied to any one coordinate line is less than a critical value required to change the state of the cell. However, the sum of the excitations at the given cell position is greater than the critical value. Therefore, only the state of the given cell is changed while the state of the remaining cells of the array is unchanged.

The driving excitation may be of one or the other polarity in order to excite the cell from one stable state to the other, and vice versa. For example, in a coincident current array in which magnetic cores are used as the binary cells, current pulses of one or the other polarity are often employed. In arrays using ferro-electric crystals as the binary cells, voltage pulses of one or the other polarity are usually used. Electronic tubes are presently employed as the driving means for memory systems. In the case of magnetic memories, a relatively expensive, high-current driver is required.

It is an object of the present invention to reduce the number of driving means for a memory system from the number heretofore required.

Another object of the invention is to provide a memory system more reliable and more economical than prior systems.

A further object of the invention is to reduce the number of driver tubes in memory systems from the number used in prior memory systems.

Still another object of the present invention is to provide an improved means for writing information into and reading information out of a memory system.

According to the invention, a concurrent excitation memory system has elements arranged in rows and columns. The row lines are paired, any row belonging to only one pair. For example, the first row is paired with the second, the third with the fourth, and so on. The elements of a selected column are excited in one sense. The elements of a selected pair of rows are excited, those of the two rows of the selected pair being excited in opposite senses. Thus, two elements at the intersection of the selected column and pair of rows are excited together. The element selected for concurrent excitation in the same one sense depends on the sense of excitation of the elements of the selected pair of rows. In a similar manner, when the excitation of the elements of a column is in the other second sense, which is opposite the one sense, either of the two elements may be excited concurrently in the second sense, depending again upon the sense of excitation of the elements of the selected pair of rows.

According to a further feature of the invention, the elements of a column are excited first in the one sense and then in the opposite sense. A binary one or a binary zero can be written into or read out of a selected one of the two elements at the intersection of the selected column and pair of rows by programming the row excitation to excite the selected elements concurrently with the excitation in the one sense or concurrently with the excitation in the opposite sense.

The invention may be extended to elements individually identifiable as corresponding to the elements of an array arranged in rows and columns, and also to elements individually identifiable as corresponding to the elements of an $n$-dimensional array where at least one set of the $n$ sets of coordinate lines of the array are arranged according to the present invention.

The invention will be more fully understood, both as to its organization and method of operation, from the following description when read in connection with the accompanying drawing in which:

Fig. 1 is a schematic diagram of a memory system and the arrangement of the driving means therefor, according to the invention, and Fig. 2 is a graph of waveforms useful in explaining the operation of the memory system of Fig. 1.

Referring to Fig. 1, the memory system 10 is comprised of a two-dimensional, rectangular array 12 of binary cells 14. The array 12 is, illustratively, arranged in 256 columns and 8 rows. The upper right-hand corner of the array 12 is broken away and shows, in detail, the manner in which the row winding 30, the column windings 16 and the output winding 64 are coupled to four of the binary cells 14. For the purpose of description, the binary cells 14 may be magnetic memory cores. Each magnetic core is fabricated from a ferrite material which exhibits a substantially rectangular hysteresis characteristic. Each core of a column is linked in the same sense by a different one of the column windings 16. There are 256 different column windings 16, each of which is coupled to an individual switch core of the magnetic matrix switch 18.

The switch 18 comprises a 16 by 16 array of switch cores arranged similarly to the matrix switch described by Jan A. Rajchman in an article entitled "A Myriabit Magnetic-Core Matrix Memory," published in the October 1953 "Proceedings of the I.R.E.," pages 1407 to 1421.

A particular one of the switch cores at the intersection of a column and row of the switch 18 is selected by concurrently operating each of the matrix drivers 20. Each of the matrix drivers 20 may be comprised of sixteen different vacuum tubes each having two control grids. The anode of each one of the sixteen driver tubes of one of the matrix devices 20 is connected to one of sixteen different column windings 19 each of which links all the cores in one column of the switch 18. The anode of each one of the sixteen driver tubes of the other matrix 20 is connected to one of sixteen different row windings 23 each of which links all the cores in one row of the switch 18. A first one of the control grids of the respective driver tubes of one of the matrix drivers 20 is connected to a corresponding one of the sixteen output leads 25 of a first of the two decoders 22. Also, a first one of the control grids of the respective driver tubes of the other matrix driver 20 is connected to a corresponding one of the sixteen output leads 21 of the second of the decoders 22. The second control grid of each of the driver tubes of both matrix drivers 20 is connected to one terminal of a write-read conductor 21. The other terminal of the conductor 21 is connected to a write-read output of the logic control unit 65. Each of the decoders 22 may be comprised of a rectifier matrix which operates to select one out of sixteen output leads in accordance with a combination of four binary inputs. A detailed description of similar rectifier matrices may be found in chapter 4 of "High Speed Computer Devices," by Engineering Research Associates, published by McGraw Hill Book Co., Inc., 1950.

Each of the binary inputs of each of the decoders 22 is connected to a corresponding one of four different binary outputs of two different column registers 24. Each column register 24 may be comprised of four different flip-flops each having a set input, a reset input, and a "zero" and a "one" output. A common reset conductor 26 is connected to each reset input. Reset signals are applied to the reset conductor 26 by the reset output of the logic control unit 65. The set inputs of each of the eight flip-flops have an individual address conductor connected thereto. Each of the address conductors is assigned one digit of an eight-digit binary number. An eight-digit binary number is able to uniquely determine 256 different combinations and, therefore, can represent 256 different column positions. The corresponding address conductor of each of the column registers 24 is connected to one of the eight conductors of the trunk line 67 which, for convenience, is shown in the drawing as a single line. The eight conductors of the trunk line 67 are connected to eight different column address outputs of the logic control unit 65.

Each core of a pair of rows is linked by a different one of the row windings 30. Any one row winding 30 links one row of the pair of rows in one sense and links the other row of the pair of rows in the opposite sense. Thus, the eight rows of the memory array 12 are linked by only four different row windings 30. One terminal of each row winding 30 is connected to an individual one of four row drivers 32. The other terminal of each of the row windings 30 is connected to a common ground, indicated by the conventional ground symbol. Each of the row drivers 32 may be comprised of a pair of vacuum tubes connected in push-pull across the primary winding of a pulse transformer (not shown). One terminal of the secondary winding of the pulse transformer is connected to the one terminal of a row winding 30, and the other terminal of the secondary winding is connected to the common ground. A first one of the control grids of one of the row-driver vacuum tubes is connected to a conductor 34, and the second control grid of each row driver 32 is connected to a conductor 36. Each of the conductors 34 and 36 is connected to one of the two outputs of a separate one of the driver gates 38. Each of the driver gates 38 may be comprised of a pair of "and" gates, each having two inputs and a single output. The output of a first of the pair of "and" gates is connected to the conductor 34 and the output of the second of the pair of "and" gates is connected to the conductor 36. One of the inputs of each pair of "and" gates of each of the driver gates 38 is connected to an individual one of the output leads 39 through 42 of a one-out-of-four decoder 44.

The decoder 44 may be similar to the decoders 22 previously described, except that there are but two binary inputs and four different outputs. The binary inputs of the decoder 44 are respectively connected to the "one" and "zero" outputs of the flip-flops FF2 and FF3 of a row register 46. The row register 46 is comprised of three different flip-flops FF1, FF2, and FF3, each having a set input, a reset input, and a "zero" and a "one" output. The "zero" output of the flip-flop FF1 of the row register 46 is connected, in parallel to one of the inputs of each of two different two-input "and" gates 48 and 49. The "one" output of the flip-flop FF1 is connected in parallel to one of the inputs of each of two other two-input "and" gates 50 and 51. The second input of each of the "and" gates 49 and 50 is connected via a write "0" conductor 52 to a write-"0"-output of the logic control unit 65. The second input of each of the "and" gates 48 and 51 is connected via a write-"1"-read conductor 54 to a write-"1"-read output of the logic control unit 65. The output of each of the "and" gates 48 and 50 is connected to a respective one of the two inputs of a first two-input "or" gate 56. The output of each of the "and" gates 49 and 51 is connected to a respective one of the inputs of a second two-input "or" gate 58. The output of the "or" gate 56 is connected in parallel to the second input of the first of the pair of "and" gates of each of the driver gates 38. The output of the "or" gate 58 is connected in parallel to the second input of the second of the pair of "and" gates of each of the driver gates 38. Each set input of the flip-flops FF1 through FF3 of the row register 46 is connected to one of the leads of the trunk line 73 which is shown in the drawing as a single line. The trunk line 73 includes three different row address conductors. The three address conductors of the trunk line 73 are, respectively, connected to one of three different row address outputs of the logic control unit 65. The common reset conductor 36 is connected to the reset input of the row-register flip-flops.

An output winding 64 is linked to each core of the array 12. The sense of linkage of the output winding 64 reverses in every other core of the array in the known checkerboard fashion. Each terminal of the output winding 64 is connected to one of the inputs of a utilization device 75. The device 75 may be any device responsive to a voltage induced in the output winding 64 when a selected one of the memory cores is interrogated. The "and" and "or" gates may be any conventional type, for example, the known crystal diode type.

The operation of the memory system 10 of Fig. 1 will be explained in connection with the waveforms of Fig. 2. The pulse 69 of the waveform 68 is furnished by the logic control unit 65 to the conductor 21 each time it is desired to write information into or read information out of the array. The leading edge of the pulse 69, in conjunction with the priming level applied by each of the decoders 22, causes one of the driver tubes of each of the matrix drivers 20 to conduct. The switch core thus selected is driven from one state of saturation to the other, thereby producing the pulse 71 of the waveform 70 in the desired column winding 16. When the pulse 69 is terminated, the driver tubes cease to conduct and the bias returns the selected switch core back to the one direction of saturation thereby causing the pulse 73 of the waveform 70 to flow in the desired column winding 16.

Each of the row drivers 32 can furnish either a positive pulse or a negative pulse such as the odd-row pulses 78 or 80 of the waveform 75 and the even-row pulses 82 or 84 of the waveform 77. Note that the duration of the pulses of the waveforms 75 and 77 is made much longer than the duration of the pulses of the waveform 70. Also note that the pulses of the waveforms 75 and 77 begin earlier and terminate later than the corresponding pulses of the waveform 70.

The advantage of the longer-duration pulses is described in application Serial No. 472,292 entitled "Memory System," by Richard O. Endres, which is filled concurrently herewith. Briefly, the advantage resides in the fact that the noise output of a magnetic core exists substantially only during the rise and decay times of the applied excitation current. Consequently, in a double-coincident system, when one of the pulses of the pair is applied prior to the other pulse, the noise voltages which are induced in the output winding by the cores which are half-excited by this one pulse die out before the other switching pulse is applied. Thus, only the noise contribution of the second switching pulse is induced in the output winding when a memory core is thus interrogated. Likewise, when the second switching pulse is terminated before the first pulse, the noise signal is also reduced. Other advantages of the longer-duration pulses include the avoidance of the necessity for making the two pulses exactly coincident as in the prior systems, and the fact that the rise and decay times of the longer-duration pulse can be made much slower. A substantial noise reduction can be achieved by using a rectangular array. In such case, there are considerably more memory cores located in a row than are located in a column. Thus, if the longer-duration pulse is first applied to the selected row winding and the shorter-duration pulse is applied to the selected column winding, then only the noise contributed by the half-excited column cores appears during the read-out time interval. In order to obtain the advantages of a rectangular array, according to the prior art, it would be necessary to provide a separate row driver for each individual row because a magnetic matrix switch furnishes pulses of the same duration. Furthermore, two different magnetic matrix switches would have to be provided in the case where it is desired to apply the two different waveforms of opposite-polarity pulses because each core of the matrix switch is biased to the same direction of saturation.

Assume, now, that it is desired to write a binary one, represented by the state P of the core, into the core located at the intersection of the first row and the 256th column of the array 12. Initially, each flip-flop of the row register 46 and the column registers 24 is in its reset condition with the anode of the flip-flop corresponding to its zero output at a high potential level. The reset pulse is furnished by the logic control unit 65 subsequent to each write-in and read-out of the memory array 12. The logic control unit 65 may be any suitable device, for example, a digital computer which is adapted to furnish the required signals. The binary code combination corresponding to the 256th column is applied via the eight conductors of the trunk line 67 to the respective set inputs of the four flip-flops of both of the column registers 24. The binary combination, in such case, is the one having a binary one, or a pulse, on all eight leads of the trunk line 67. These pulses trigger the flip-flop in each of the column registers 24, thereby staticizing the $2^8$ binary position or the 256th column in the column registers 24. Thus, the one side of each of the eight flip-flops is at a high level, and the zero side of each of the flip-flops is at a low level.

This combination of zero and one input signals which is applied to the respective decoders 22 raises the voltage level of the 16th conductor of each of the decoders 22 to prime the 16th one of the driver tubes in each of the matrix drivers 20. The logic control unit 65 furnishes the binary combination corresponding to the first row via the trunk line 73 to the row register 46. In such case, a binary zero or no pulse appears on each of the leads of the trunk line 73. Therefore, the zero side of each of the flip-flops FF1, FF2, and FF3 remains high. The combination of zero and one signals furnished by the flip-flops FF2 and FF3 is decoded by the decoder 44 and raises the voltage level on the conductor 39 to prime the pair of "and" gates in the first one of the driver gates 38. The high-level output of the zero side of the flip-flop FF1 primes each of the "and" gates 49 and 48.

In the present embodiment, it is assumed that a binary one is represented by the P state of a memory core 14 which is reached by exciting the core with two half-amplitude, positive pulses. Therefore, the excitation pulses applied to the respective row and column windings must be of a positive polarity. After the levels of the flip-flops of the column registers 24 and the row register 46 have been set, the logic control unit 65 furnishes the pulse 78 of the waveform 75 to the write-"1"-read conductor 54. This pulse is applied to the second input of the "and" gates 48 and 51. However, only the "and" gate 48 is primed and, therefore, only this gate furnishes an output signal which is passed through the "or" gate 56 to the second input of the first of the pair of "and" gates in each of the driver gates 38. No output is furnished by the unprimed "and" gate 51. The first "and" gate of the first driver gate 38 passes the pulse 78 to the P output conductor 34. The pulse on the conductor 34 causes one of the driver tubes of the first row driver 38 to furnish a positive pulse (similar to the pulse 78) to the first row winding 30.

At a time *t*, after the pulse 78 has reached a steady amplitude, the logic control unit 65 furnishes the pulse 69 of the waveform 68 to the write-read conductor 21. This pulse is applied to the second control grid of each of the driver tubes of the matrix driver 20. An output pulse is furnished by the primed, sixteenth tube of each of the matrix drivers 20. The two pulses coincide in the 256th switch core of the matrix 18, causing this core to be excited from the one state of saturation to the other, thereby furnishing the positive pulse 71 of the waveform 70 to the 256th column winding 16. The pulse 78 of the waveform 75 and the pulse 71 of the waveform 70 coincide in the memory core 14 at the intersection of the first row and the 256th column. Therefore, this memory core is excited to its P stable state.

Note that these two pulses also coincide in the second memory core 14 which is located at the intersection of the second row and the 256th column. However, the senses of linkage of the row winding 30 and the column winding 16 are opposite in the second row and, therefore, the effect of the two pulses is to cancel each other and leave the state of this second core unaltered. The remaining cores which are linked by the excited row and column windings are also unaltered because the amplitude of the two pulses is regulated to be less than the critical value at which the state of a core is changed. The pulse 78 of the waveform 75 is terminated before the pulse 69 of the waveform 68 and, therefore, the current flow in the first row ceases. Upon the termination of the pulse 69 of the waveform 68, the voltages applied to the respective row and column windings of the switch matrix 18 cease and the bias potential of the excited switch core returns the core back to the one state of saturation. When the switch core is thus returned, the pulse 73 of the waveform 70 flows in the 256th column winding 16. However, the amplitude of this pulse is insufficient to alter the state of saturation of any of the cores which are coupled to the 256th column winding.

A binary one can be written into the memory core located at the intersection of the second row and the 256th column in a similar fashion except that the pulse 82 of the waveform 77 is furnished by the first of the row drivers 32 instead of the pulse 78 of the waveform 75. For example, the column registers 24 and the row register 46 are reset by a pulse applied to reset inputs of their respective flip-flops. The logic control unit again furnishes the binary combination corresponding to the 256th column which sets up the column registers 24, and is decoded by the decoders 22 to prime the sixteenth driver tube of each of the matrix drivers 20. The logic control unit 65 furnishes the binary code combination corresponding to the second row to the row register 46, thereby raising the voltage level of the one side of the flip-flop FF1. The zero side of each of the flip-flops FF2 and FF3 remains high. The one side of the flip-flop FF1 primes the "and" gates 50 and 51. The combination of signals furnished by the flip-flops FF2 and FF3 is decoded by the decoder 44 and raises the voltage level on the conductor 39 to prime each of the pair of "and" gates of the first of the driver gates 38. The logic control unit 65 furnishes a pulse similar to the pulse 82 of waveform 77 to the write-"1"-read conductor 54. This pulse is passed through the primed "and" gate 51 and the "or" gate 58 to the second input of the second of the pair of "and" gates of the first of the driver gates 38. The second "and" gate furnishes a pulse to the conductor 36 which is applied to the control grid of the second of the tubes of the first row driver 32, thereby causing a negative pulse similar to the pulse 82 of the waveform 77 to be applied to the first row winding.

At the time $t$ after the initiation of the pulse 82, the logic control unit furnishes the pulse 69 of the waveform 68 to the write-read conductor 21. This pulse causes the sixteenth driver tube of each of the matrix drivers 20 to condut. The 256th switch core of the matrix 18 is excited from saturation in the one direction to saturation in the other direction and causes a current flow in the 256th column winding 16 similar to the pulse 71 of the waveform 70. The pulse 71 and the pulse 82 are additive in the memory core 14 located at the intersection of the second row and the 256th column position. The net magnetizing force produced is sufficient to drive this memory core to its P stable state. The negative pulse 82 is additive in the memory core of the second row and the 256th column because the senses of the first row winding 30 and the 256th column winding 16 are opposite in the core. The memory core located at the intersection of the first row and 256th column is unchanged because the two windings link this core in the same sense.

Thus, a method of writing a binary one into one or the other of two memory cores of a given column which are linked by the same row winding has been described. When it is desired to write a binary one into an odd row, the pulse 78 of the waveform 75 is used in conjunction with the pulse 71 of the waveform 70. When it is desired to write a binary one into an even row, the pulse 82 of the waveform 77 is used in conjunction with the pulse 71 of the waveform 70.

A binary zero can be written into a selected memory core in a similar fashion with the exception that the logic control unit furnishes a pulse to the write "0" conductor 52 at a time $t_1$ after the pulse 69 of the waveform 68 is applied to the write-read conductor 21. For example, a binary zero can be written into the memory core located at the intersection of the first row and the 256th column as follows: The logic control unit 65 furnishes the address of the 256th column to the column registers 24 and the address of the first row to the row register 46. Therefore, the 16th driver of each of the matrix drivers 20 is in the primed condition. The zero side of the flip-flop FF1 primes each of the "and" gates 48 and 49 and the decoder 44 operates to prime each of the pair of "and" gates of the first of the driver gates 38. The logic control unit 65 then furnishes a pulse corresponding to the pulse 69 of the waveform 68 to the write-read conductor 21. This pulse renders the primed drivers of the matrix drivers conductive, thereby exciting the switch core corresponding to the 256th column from the one direction of saturation to the other. When the switch core is thus excited, the half-amplitude pulse 71 of the waveform 70 flows in the 256th column winding 16. The pulse 71 does not alter the condition of any memory core coupled to the excited column winding 16 due to its reduced amplitude. When the excited switch core reaches its other direction of saturation, the pulse 71 terminates. However, the continued conduction of the matrix driver tubes maintains the excited switch core in its other state of saturation.

At a time $t_1$ after the initiation of the pulse 69, the logic control unit applies the pulse 80 of the waveform 75 to the write-"0"-conductor 52. This pulse is passed through the primed "and" gate 49 and the "or" gate 58 to the second input of the second of the pair of "and" gates of the first driver gates 38. The second "and" gate then furnishes an output pulse to the conductor 34 which is applied to the control grid of the second of the tubes of the first row driver 32. The first row driver 32 then furnishes a negative pulse, similar to the pulse 80 of the waveform 75, to the first row winding 30. At a time $t_2$ after the pulse 80 is initiated, the logic control unit 65 terminates the pulse 69 which was applied to the write-read conductor 21. Therefore, the conducting tube of each of the matrix drivers 20 is cut-off. The bias of the switch 18 returns the excited switch core to its one direction of saturation. The change of flux in the switch core causes a current flow in the 256th column winding similar to the pulse 73 of the waveform 75. The coincidence of the pulse 80 and the pulse 73 in the memory core of the first row and 256th column produces a sufficient magnetizing force to excite it to its N stable state. Again, the memory core located at the intersection of the second row and the 256th column is not affected because the senses of the excited row and column windings are opposite in this core. The remaining cores linked by the excited row and column windings are not affected by the half-amplitude current pulses which are applied to the one-row and the one-column winding.

A binary zero can be written into the memory core located at the intersection of the second row and the 256th column in a similar fashion except that the positive pulse 84 of the waveform 77 is applied to the first row winding 30. To write a binary one in this memory core, the column registers 24 and the row register 46 are reset. The logic control unit 65 furnishes the address of the desired 256th column to the column registers 24. Accordingly, the 16th driver tube of each of the matrix drivers 20 is primed. The logic control unit 65 also sets up the row register 46 to correspond to the address of the desired second row with one side of the flip-flop FF1 high. The decoder 44 raises the voltage level on the conductor 39, thereby priming the pair of "and" gates of the first of the driver gates 38. The one side of the flip-flop FF1 primes each of the "and" gates 50 and 51. The pulse 69 of the waveform 68 is applied by the logic control unit 65 to the write-read conductor 21. The leading edge of the pulse 69 causes the pulse 71 of the waveform 70 to flow in the 256th column winding 16.

At a time $t_1$ after the initiation of the pulse 69, the logic control unit furnishes a pulse to the write "0" conductor 52. This pulse is passed through the primed "and" gate 50 and the "or" gate 56 to the second input of the first of the pair of "and" gates of the first driver gates 38. The first "and" gate then furnishes an output pulse to the conductor 34 which is applied to the control grid of the first of the tubes of the first row driver 32. The first row driver 32 conducts and furnishes a positive pulse similar to the pulse 84 of the waveform 77 to the first row winding 30. At the time $t_2$ when the pulse 84 has reached its steady value, the logic control unit 65 terminates the pulse 69 of the waveform 68. The excited switch core is returned to its one state of saturation by the bias voltage of the switch 18. The change of flux in the switch core causes a pulse similar to the pulse 73 of the waveform 70 to flow in the 256th column winding 16. The coincidence of the pulses 73 and 84 in the memory core, located at the intersection of the second row and the 256th column, produces sufficient magnetizing force to excite this memory core to its N stable state. The memory core located at the intersection of the first row and the 256th column is not affected because the pulses 73 and 84 cancel each other. Again, the remaining memory cores are not affected by these half-amplitude pulses.

Information can be read out of a given memory core 14 by applying a half-amplitude pulse to a selected row winding 30 and a selected column winding 16. The polarity of the half-amplitude pulses is chosen such that the net excitation applied to the given core tends to magnetize the given core to its P stable state. In the case of an odd-row core, a positive, half-amplitude pulse is applied to the row winding 30. In the case of an even-row core, a negative, half-amplitude pulse is applied to the row winding 30. By observing the voltage induced in the output winding 64, the information stored in the given memory core can be ascertained. Thus, if the given core is already in its P stable state, very little or no voltage is induced in the output winding 64, indicating that a binary one was stored in the selected core. A relatively high output voltage induced in the output winding 64 indicates that a binary zero was stored in the selected core. The given core is interrogated by applying a pulse to the write-read conductor 21 to excite the desired column and applying a pulse to the write "1" read conductor 54 to excite a desired row. The row address staticized in the row register 46 operates to prime both of the pair of "and" gates of the one of the driver gates 38 which corresponds to the desired row, and to prime two different ones of the "and" gates 48—51 which determine whether the row is odd or even. When an odd row is selected, the pulse 78 of the waveform 75 is applied to the selected row winding 30. When an even row is selected, the pulse 82 of the waveform 87 is applied to the selected row winding 30.

Only four "and" gates and two "or" gates are necessary to operate a memory array having any desired number of rows because it is only necessary to determine whether the selected row is odd or even. When a memory core located in an odd row is selected, the zero side of the flip-flop FF1 is high. When a memory core located in an even row is selected, the one side of the flip-flop FF1 is high.

Suitable restoration circuits can be used to restore the information read out of the interrogated memory core 14. The restoration circuits operate to write a binary zero back into the selected memory core when a relatively high voltage is induced in the output winding 64. When a small or no voltage is induced in the output winding 64, it is not necessary to restore the excited memory core 14 because it returns to its P stable state when the excitations are removed from the coupled row and column windings.

Other of the known methods for writing information into and reading information out of a memory array may be employed. For example, one of the excitation pulses can be a full, amplitude pulse and the other excitation pulse can be a half-amplitude inhibit pulse.

There has been described herein an improved memory system for storing binary encoded information. The description of the present invention in conjunction with a two-dimensional array of magnetic cores is illustrative only. It will be apparent to those skilled in the art that other arrays of magnetic cores, wherein coincident switching is used, may be employed. Driver-tube economy can be obtained, according to the invention, in situations where arrays of binary cells other than magnetic cores comprise the memory system.

What is claimed is:

1. A memory system comprising a plurality of bistable storage elements, said elements being individually identifiable as corresponding to the elements of an array arranged in rows and columns, means for exciting all the elements corresponding to an individual, selected one of the columns in the same sense, and means for exciting all the elements corresponding to a first row of an individual, selected pair of rows in the same one sense and all the elements of the other row of said pair of rows in the sense opposite to the one sense.

2. A memory system comprising a plurality of bistable storage elements, said elements being individually identifiable as corresponding to the elements of an array arranged in rows and columns, a plurality of row excitation means, a plurality of column excitation means, each of said column excitation means being arranged to excite all the elements corresponding to an individual one of the columns in the same sense, each of said row excitation means being arranged to excite all the elements corresponding to a first row of an individual pair of rows in the same one sense and all the elements of the other row of the said pair of rows in the sense opposite to the one sense.

3. A memory system as recited in claim 2 including means to excite a selected one of said column excitation means in a first sense, and means to excite a selected one of said row excitation means selectively either in a first sense or in the sense opposite to the first sense.

4. A memory system as recited in claim 2 wherein said bistable storage elements are magnetic cores, and said row and column excitation means are windings.

5. A memory system as recited in claim 2 wherein said array is a rectangular array having a greater number of elements in said rows than in said columns.

6. A memory system as recited in claim 2 including an output means coupled to all of said storage elements, said output means being responsive to indicate the state of a selected one of said elements when the row and column excitation means intersecting at the array position of said selected element are conveniently excited.

7. A memory system comprising a plurality of bistable storage elements disposed in an ordered arrangement, said arrangement having a plurality of sets of coordinate lines for selectively exciting an individual one of said elements to one or the other of its stable states, common means to excite one line of a pair of coordinate lines of one set to furnish an excitation in one sense to one group of said elements and to excite the other line of said pair of lines to furnish an excitation in the opposite sense to a different group of said elements, and each coordinate line of each of said other sets being arranged to furnish an excitation in the same sense to one group of said elements.

8. A memory system as recited in claim 7 wherein said elements are individually identifiable as corresponding to the elements of a two-dimensional array arranged in rows and columns.

9. A memory system as recited in claim 7 wherein said elements are arranged in a two-dimensional, rectangular array, said one set of coordinate lines being arranged in pairs, one line of any one of said pairs being arranged for exciting the elements along one coordinate line of said pair in one sense and the other line of said pair being arranged for exciting the elements along the other coordinate line of said pair in the opposite sense.

10. A memory system comprising a plurality of bistable storage elements, said elements being individually identifiable as corresponding to the elements of an array arranged in rows and columns, a plurality of row excitation windings, a plurality of column excitation windings, a magnetic switch having a plurality of outputs, each of said outputs being connected to a different one of said column windings, said magnetic switch being arranged to furnish a waveform on a selected one of said column windings comprising a first pulse of one polarity followed by a second pulse of the opposite polarity, a plurality of driving means each connected to a different one of said row windings and each arranged to furnish selectively either a pulse of one polarity or a pulse of the opposite polarity, means for operating said magnetic switch to furnish said waveform on a selected one of said outputs, and means for operating a selected one of said driving means to furnish selectively either a pulse of one polarity or a pulse of the opposite polarity during the time interval when either said first pulse or said second pulse of said waveform is present on said selected column winding.

References Cited in the file of this patent

UNITED STATES PATENTS

| | | |
|---|---|---|
| 1,504,882 | Elmen | Aug. 12, 1924 |
| 2,709,248 | Rosenberg | May 24, 1955 |
| 2,776,419 | Rajchman | Jan. 1, 1957 |

OTHER REFERENCES

Thesis, M. K. Haynes, Dec. 28, 1950 (pp. 21–28).

Publication, Electronics, April 1953, pp. 146–149.